United States Patent
McCollum et al.

(10) Patent No.: US 8,998,478 B2
(45) Date of Patent: Apr. 7, 2015

(54) LIGHTING ASSEMBLY

(75) Inventors: Timothy A. McCollum, Avon Lake, OH (US); Jeffery R. Parker, Richfield, OH (US); Fumitomo Hide, San Jose, CA (US); Alexey Titov, Sagamore Hills, OH (US); Ian Hardcastle, Sunnyvale, CA (US); Robert M. Ezell, Brunswick, OH (US)

(73) Assignee: Rambus Delaware LLC, Brecksville, OH (US)

( * ) Notice: Subject to any disclaimer, the term of this patent is extended or adjusted under 35 U.S.C. 154(b) by 325 days.

(21) Appl. No.: 13/448,688

(22) Filed: Apr. 17, 2012

(65) Prior Publication Data

US 2012/0268966 A1    Oct. 25, 2012

Related U.S. Application Data

(60) Provisional application No. 61/477,370, filed on Apr. 20, 2011.

(51) Int. Cl.
| | |
|---|---|
| *F21S 8/06* | (2006.01) |
| *F21V 7/05* | (2006.01) |
| *F21V 8/00* | (2006.01) |
| *F21S 6/00* | (2006.01) |

(Continued)

(52) U.S. Cl.
CPC .. *F21S 8/06* (2013.01); *F21S 6/002* (2013.01); *F21S 8/033* (2013.01); *F21V 7/05* (2013.01); *F21Y 2101/02* (2013.01); *F21Y 2105/00* (2013.01); *F21Y 2105/008* (2013.01); *G02B 6/0011* (2013.01); *G02B 6/0063* (2013.01)

(58) Field of Classification Search
CPC ...................................... F21S 8/06; F21V 7/05

USPC ........................................... 362/615, 147, 559
See application file for complete search history.

(56) References Cited

U.S. PATENT DOCUMENTS 5,027,258 A * 6/1991 Schoniger et al. ............ 362/629
6,350,041 B1 * 2/2002 Tarsa et al. .................... 362/231

(Continued)

FOREIGN PATENT DOCUMENTS

KR    20080086501    9/2008    ................ F21V 3/00

OTHER PUBLICATIONS

International Search Report and Written Opinion of the International Searching Authority re PCT/US2012/033902 filed Apr. 17, 2012 mailed Oct. 31, 2012. 9 pages.

(Continued)

*Primary Examiner* — Peggy Neils
*Assistant Examiner* — Zheng Song
(74) *Attorney, Agent, or Firm* — Renner, Otto, Boisselle & Sklar, LLP (57) ABSTRACT

A lighting assembly includes a light guide having a first major surface, a second major surface opposite the first major surface, a light input edge, and an end edge distal the light input edge. Light input to the light guide through the light input edge propagates by total internal reflection toward the end edge. The lighting assembly further includes light extracting elements at least one of the major surfaces of the light guide, the light extracting elements configured to extract light through the first major surface in a direction away from the light input edge and away from the first major surface, and a banding reduction element at the end edge configured to redirect light incident thereon in a direction away from the light input edge.

27 Claims, 8 Drawing Sheets

(51) Int. Cl.
*F21S 8/00* (2006.01)
*F21Y 101/02* (2006.01)
*F21Y 105/00* (2006.01)

(56) References Cited

U.S. PATENT DOCUMENTS

| | | | |
|---|---|---|---|
| 6,612,729 B1 | 9/2003 | Hoffman | 362/551 |
| 6,880,963 B2 * | 4/2005 | Luig et al. | 362/560 |
| 7,699,504 B2 * | 4/2010 | Sun et al. | 362/332 |
| 7,878,688 B2 | 2/2011 | Paulussen et al. | 362/296.1 |
| 7,954,975 B2 * | 6/2011 | Zhou | 362/147 |
| 8,128,267 B2 * | 3/2012 | Sormani et al. | 362/555 |
| 8,278,806 B1 * | 10/2012 | Moskowitz | 313/113 |
| 8,362,681 B2 * | 1/2013 | Hussell et al. | 313/488 |
| 8,475,010 B2 * | 7/2013 | Vissenberg et al. | 362/311.12 |
| 8,827,531 B2 * | 9/2014 | Richardson et al. | 362/623 |
| 2006/0050530 A1 | 3/2006 | Stefanov et al. | 362/602 |
| 2008/0192458 A1 * | 8/2008 | Li | 362/84 |
| 2010/0149815 A1 | 6/2010 | Erchak | 362/293 |
| 2010/0246158 A1 * | 9/2010 | Van Gorkom et al. | 362/19 |
| 2011/0013420 A1 * | 1/2011 | Coleman et al. | 362/612 |
| 2011/0170290 A1 * | 7/2011 | Hikmet et al. | 362/235 |

OTHER PUBLICATIONS

PCT International Preliminary Report on Patentability dated Oct. 31, 2013 (Chapter I) in International Application No. PCT/US2012/033902. 5 pages.

* cited by examiner

LIGHTING ASSEMBLY

RELATED APPLICATION DATA

This application claims the benefit of U.S. Provisional Patent Application No. 61/477,370, filed Apr. 20, 2011, the disclosure of which is incorporated herein by reference in its entirety.

BACKGROUND

Energy efficiency has become an area of interest for energy consuming devices. One class of energy consuming devices is lighting assemblies. Light emitting diodes (LEDs) show promise as energy efficient light sources for lighting assemblies. But light output distribution is an issue for lighting assemblies that use LEDs or similar light sources.

DESCRIPTION

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments.

Aspects of this disclosure relate to a lighting assembly. The lighting assembly includes a light guide having a first major surface, a second major surface opposite the first major surface, a light input edge, and an end edge distal the light input edge. Light input to the light guide through the light input edge propagates by total internal reflection toward the end edge. The light assembly further includes light extracting elements at least one of the major surfaces of the light guide, the light extracting elements configured to extract light from the light guide through the first major surface in a direction away from the light input edge and away from the first major surface, and a banding reduction element at the end edge and configured to redirect light incident thereon in a direction away from the light input edge. The lighting assembly is described in greater detail herein with reference to the various embodiments illustrated in the figures.

Figure 1:
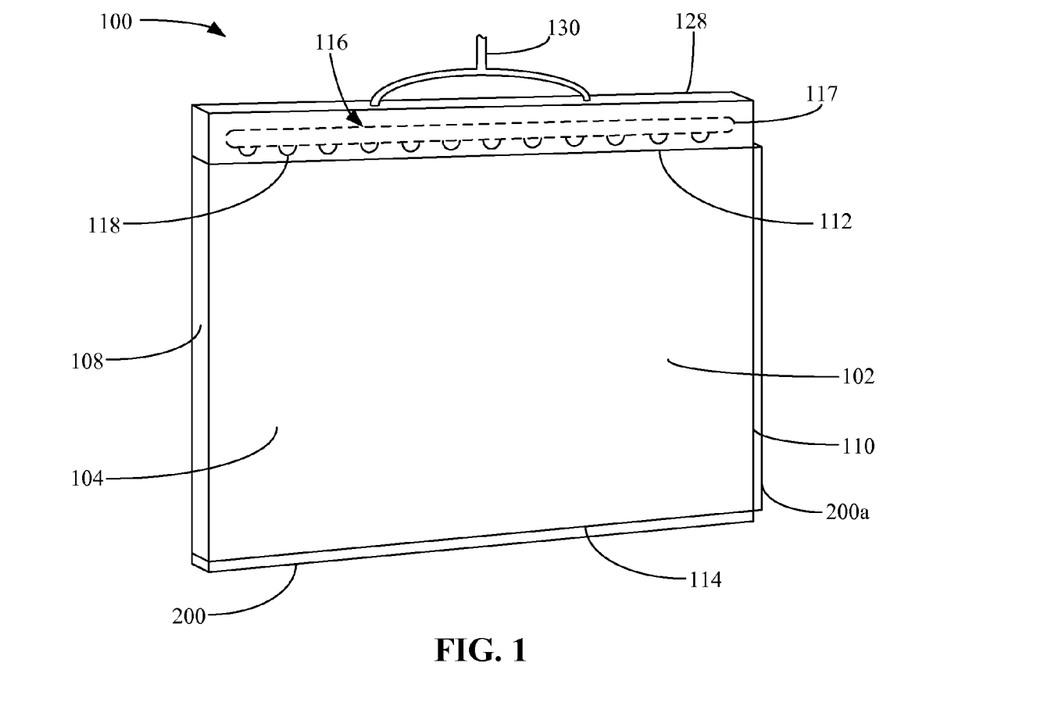
FIG. 1 is a schematic view of an exemplary lighting assembly.
Figure 2:
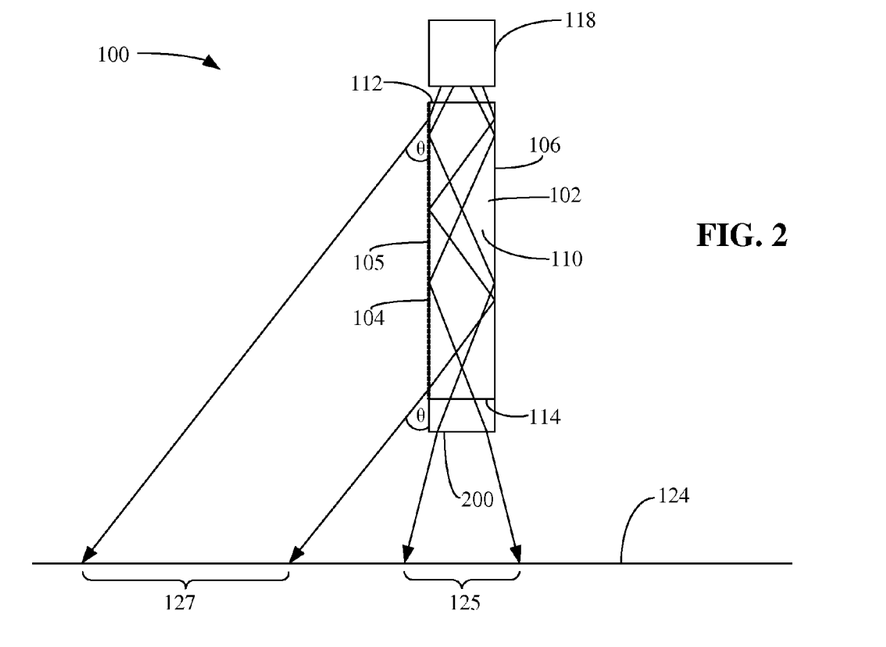
FIGS. 2 and 3 are schematic views showing parts of embodiments of a lighting assembly.
Figure 3:
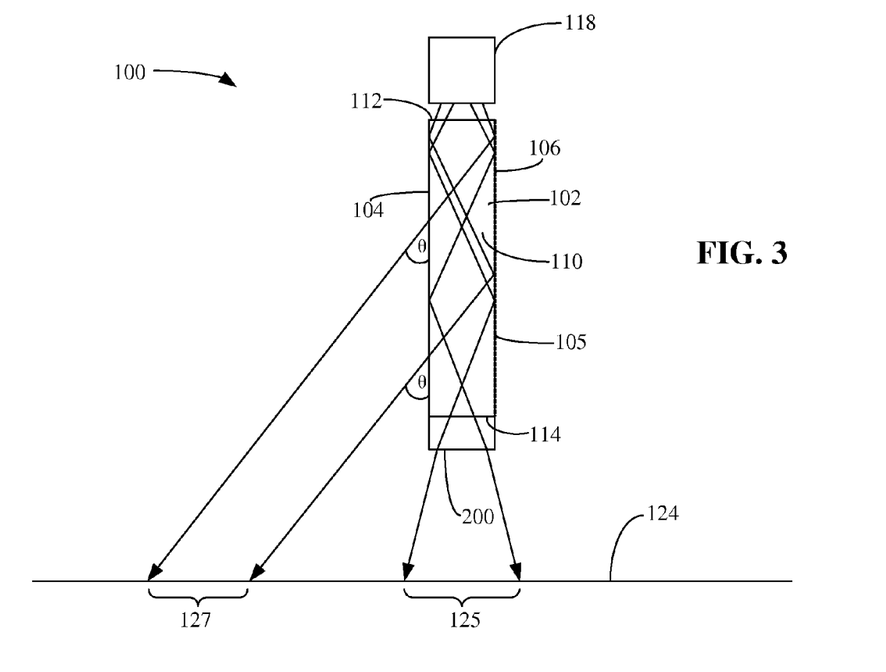

With reference to FIGS. 1-3, the lighting assembly 100 includes a light guide 102, which is a solid article made from, for example, acrylic, polycarbonate, glass, or other appropriate material. The light guide 102 may be rigid or flexible. The light guide 102 may also be a multi-layer light guide having two or more layers that may differ in refractive index. The light guide 102 includes a first major surface 104 and a second major surface 106 opposite the first major surface 104. The light guide 102 is configured to propagate light by total internal reflection between the first major surface 104 and the second major surface 106.

The light guide 102 has at least one edge, the total number of edges depending on the configuration of the light guide 102. In the case where the light guide 102 is rectangular (e.g., as shown in FIG. 1), the light guide 102 has four edges 108, 110, 112, 114 (e.g., side edges 108, 110, end edge 112, and end edge 114). In other embodiments, the light guide has a different shape, and the total number of edges is different. For example, where the light guide 102 is a hollow cylinder, is frustroconical, is a frustrated pyramid, is a dome with a hole at the dome's apex, or another similar shape, the light guide has two opposing edges 112, 114 (e.g., end edge 112 and end edge 114). Other geometries for the light guide 102 result in a corresponding number of edges. Depending on the geometry of the light guide 102, each edge may be straight or curved, and adjacent edges may meet at a vertex or join in a curve. In some embodiments, the light guide 102 includes an edge (not shown), completely surrounded by the light guide 102. Such an edge is usually the edge of a through-hole that extends between the major surfaces of the light guide 102.

Light emitted from one or more light sources 118 is directed toward the end edge 112 that will now be referred to as a light input edge 112.

The light guide 102 includes light extracting elements 105 in or on at least one of the major surfaces 104, 106. Light extracting elements 105 that are in or on a major surface 104, 106 will be referred to as being "at" the major surface. Each light extracting element functions to disrupt the total internal reflection of the propagating light that is incident on the light extracting element. In one embodiment, the light extracting elements 105 reflect light toward the opposing major surface so that the light exits the light guide 102 through the opposing major surface. Alternatively, the light extracting elements 105 transmit light through the light extracting elements 105 and out of the major surface of the light guide 102 having the light extracting elements 105. In another embodiment, both of these types of light extracting elements 105 are present. In yet another embodiment, the light extracting elements 105 reflect some of the light and refract the remainder of the light incident thereon. Therefore, the light extracting elements 105 are configured to extract light from the light guide 102 through one or both of the major surfaces 104, 106.

Light guides having such light extracting elements 105 are typically formed by a process such as stamping, molding, embossing, extruding, laser etching, chemical etching, or another suitable process. Light extracting elements 105 may also be produced by depositing elements of curable material on the light guide 102 and curing the deposited material using heat, UV-light or other radiation. The curable material can be deposited by a process such as printing, ink jet printing, screen printing, or another suitable process.

Exemplary light extracting elements 105 include light-scattering elements, which are typically features of indistinct shape or surface texture, such as printed features, ink jet printed features, selectively-deposited features, chemically etched features, laser etched features, and so forth. Other exemplary light extracting elements 105 include features of well-defined shape, such as V-grooves, lenticular grooves, and features of well-defined shape that are small relative to the linear dimensions of the major surfaces 104, 106, which are referred to herein as micro-optical elements. The smaller of the length and width of a micro-optical element is less than one-tenth of the longer of the length and width of the light guide 102 and the larger of the length and width of the micro-optical element is less than one-half of the smaller of the length and width of the light guide. The length and width of the micro-optical element is measured in a plane parallel to the major surface 104, 106 of the light guide 102 for flat light guides or along a surface contour for non-flat light guides 102.

The light extracting elements 105 are configured to extract light in a defined intensity profile over one or both of the major surfaces 104, 106, such as a uniform intensity profile, and/or a defined light ray angle distribution. In this disclosure, intensity profile refers to the variation of intensity with position within a light-emitting region (such as the major surface 104, 106 or a light output region of the major surface 104, 106). Furthermore, the term light ray angle distribution is used to describe the variation of the intensity of light with ray angle (typically a solid angle) over a defined range of light ray angles. In an example in which the light is emitted from an edge-lit light guide, the light ray angles can range from −90° to +90° relative to the normal to the major surface 104, 106. Using variations in the light extracting elements 105, the major surfaces 104, 106 can have different intensity profiles and/or light ray angle distributions.

Micro-optical elements are shaped to predictably reflect or refract light. However, one or more of the surfaces of the micro-optical elements may be modified, such as roughened, to produce a secondary effect on light output. Exemplary micro-optical elements are described in U.S. Pat. No. 6,752,505 and, for the sake of brevity, are not described in detail in this disclosure. The micro-optical elements may vary in one or more of size, shape, depth or height, density, orientation, slope angle or index of refraction such that a desired light output from the light guide is achieved.

In some embodiments, one or more optical adjusters (not shown) are located adjacent the major surface 104, 106 of the light guide 102. Each optical adjuster has an optical modifying characteristic that modifies a property (e.g., spectrum and/or light ray angle distribution) of the light extracted through the major surface 104, 106 of the light guide 102. In one embodiment, the optical adjuster is a light redirecting member or light diffusing member that modifies light ray angle distribution. In another embodiment, the optical adjuster is a wavelength-shifting material or a color attenuator.

FIGS. 2 and 3 show embodiments where light extracting elements 105 at one of the major surfaces 104, 106 of the light guide 102 are configured to extract light from the light guide 102 through the first major surface 104 in a direction away from the light input edge 112 and away from the first major surface 104. In the embodiment of FIG. 2, light extracting elements 105 at the first major surface 104 transmit light through the light extracting elements 105 and out of the major surface 104 in a direction away from the light input edge 112 and away from the first major surface 104. In the embodiment of FIG. 3, light extracting elements 105 at the second major surface 106 reflect light toward the first major surface 104 so that the light exits the light guide 102 through the first major surface 104.

In the examples shown, the light extracted through the first major surface 104 is directed at an angle θ relative to the first major surface 104. In some embodiments, the light extracting elements 105 are configured to extract light through the first major surface 104 with a relatively narrow light ray angle distribution. In other embodiments, the light extracting elements 105 are configured such that the light ray angles of the light extracted through the first major surface 104 vary over the length and/or width of the light guide 102 to provide a broader light ray angle distribution.

The length and width dimensions of each of the major surfaces 104, 106 are much greater, typically ten or more times greater, than the thickness of the light guide 102. The thickness is the dimension of the light guide 102 in a direction orthogonal to the major surfaces 104, 106. In the rectangular embodiment, the length (measured from light input edge 112 to end edge 114) and the width (measured from side edge 108 to side edge 110) of each of the major surfaces 104, 106 are both much greater than the thickness of the light guide 102. The thickness of the light guide 102 may be, for example, about 0.1 millimeters (mm) to about 10 mm.

In the illustrated embodiment, the major surfaces 104, 106 are planar (i.e., the major surfaces 104, 106 of the light guide 102 are not curved). In other embodiments, at least a portion of the major surfaces 104, 106 of the light guide 102 is curved in one or more directions. In one example, the intersection of the light input edge 112 and one of the major surfaces 104, 106 defines a first axis, and at least a portion of the light guide 102 curves about an axis orthogonal to the first axis. In another example, at least a portion of the light guide 102 curves about an axis parallel to the first axis.

The lighting assembly 100 further includes a light source assembly 116 (e.g., as shown in FIG. 1). The light source assembly 116 includes one or more light sources 118 positioned adjacent the light input edge 112. Each light source 118 is typically embodied as one or more solid-state devices.

Exemplary light sources include such solid state devices as LEDs, laser diodes, and organic LEDs (OLEDs). In an embodiment where the light source 118 includes one or more LEDs, the LEDs may be top-fire LEDs or side-fire LEDs, and may be broad spectrum LEDs (e.g., white light emitters) or LEDs that emit light of a desired color or spectrum (e.g., red light, green light, blue light, or ultraviolet light). In one embodiment, the light source 118 emits light with no operably-effective intensity at wavelengths greater than 500 nanometers (nm) (i.e., the light source 118 emits light at wavelengths that are predominantly less than 500 nm). In some embodiments, each light source 118 included in the lighting assembly 100 has the same nominal spectrum. In other embodiments, at least some of the light sources are different from each other (e.g., two different types of light sources are alternately located along the light source assembly).

Although not specifically illustrated in detail, the light source assembly 116 also includes structural components to retain the light sources 118. In one embodiment, the light sources 118 are mounted to a printed circuit board (PCB) 117. Accordingly, the light sources 118 are fixed in position relative to one another. The light source assembly 116 may additionally include: circuitry, power supply, electronics for controlling and driving the light sources 118, and/or any other appropriate components.

Light input to the light input edge 112 of the light guide 102 propagates in different modes in the light guide 102 toward the end edge 114. Each mode of propagation is the result of a unique number of total internal reflections at the major surfaces 104, 106. The intensity of light that is incident on the end edge 114 is a function of the thickness of the light guide 102, the length of the light guide 102, and one or more of the number, size, type, density and position of the light extracting elements 105. Decreasing the thickness of the light guide 102 and/or increasing the length of the light guide 102 increases the number of modes of propagation of the light in the light guide 102, which increases the chance of the light being incident on one of the light extracting elements 105 and being extracted through one of the major surfaces 104, 106. Increasing the thickness and decreasing the length of the light guide 102 decreases the number of modes of propagation of the light in the light guide 102, which decreases the chance of the light being incident on one of the light extracting elements 105 and being extracted through one of the major surfaces 104, 106.

Light that is not extracted through one of the major surfaces 104, 106 of the light guide 102 by the light extracting elements 105 is incident on the end edge 114. At least part of this light is output from the end edge 114. Due principally to the different modes of propagation in the light guide 102, the intensity of light output from the end edge 114 varies over a defined range of light ray angles, thereby resulting in a banding effect when the output light is incident on a target surface (i.e., the light output from the end edge and incident on the target surface produces an illumination profile in which regions of higher intensity alternate with regions of lower intensity). An illumination profile characterizes the variation of intensity with location on a target surface.

The lighting assembly 100 includes a banding reduction element 200 in or on the end edge 114 that is configured to reduce the banding effect of light incident on the banding reduction element. The banding effect is "reduced" when the contrast between any regions of higher intensity and any regions of lower intensity is less than that obtained when light is emitted from the end edge 114 without banding reduction. A banding reduction element 200 that is in or on the end edge 114 will be referred to as being "at" the end edge 114. The banding reduction element 200 is configured to redirect light that propagates by total internal reflection in the light guide 102 and is incident on the banding reduction element 200. The banding reduction element 200 redirects light incident thereon in a direction away from the light input edge 112 in a manner that reduces the banding effect. Reducing the banding effect results in a more uniform intensity of light output from the banding reduction element 200 at the end edge 114 over a defined range of light ray angles and allows the light output from the banding reduction element 200 to provide useful illumination.

In one embodiment, the banding reduction element 200 is an integral part of the end edge 114. The banding reduction element 200 may be formed by making the light guide 102, including the end edge 114, using a process such as stamping, molding, embossing, extruding, or another suitable process, or by subjecting the end edge 114 of the light guide to a process such as laser etching, chemical etching, or another suitable process.

In another embodiment, the banding reduction element 200 is a separate element from the light guide 102 that is optically coupled to the end edge 114. In some implementations, the lighting assembly 100 also includes structural components (e.g., a mounting bracket) to retain the banding reduction element 200. The banding reduction element 200 may additionally or alternatively be retained using a resin or adhesive. The banding reduction element 200 may be interchangeable with another banding reduction element, examples of which will be described in more detail below. The banding reduction element 200 may be provided by one or more layers, such as gradient index layers, applied to the end edge 114. In embodiments in which the banding reduction element is a separate element, light is output from the end edge 114 of the light guide 102 and is incident on the banding reduction element 200. The end edge 114 is considered specularly transmissive (i.e., the end edge 114 lacks an optical modifying characteristic) even though specularly transmissive material refracts light that passes through a surface of the material at a non-zero angle of incidence.

The banding reduction element 200 has light redirecting properties that predictably modify the light ray angle distribution of the light output from the end edge 114 in a way that reduces the banding effect. The reference numeral 200 will be generally used to collectively refer to the different embodiments of banding reduction elements. As described below, the banding reduction element 200 may also be configured in any appropriate manner to provide an additional optical modifying characteristic in addition to the banding reduction.

FIGS. 4A-4J are cross-sectional views showing exemplary banding reduction elements 202, 204, 206, 208, 210, 212, 214, 216, 218, 220, respectively, having light redirecting properties. The banding reduction elements 202, 204, 206, 208, 210, 212, 214, 216, 218, 220 are shown in FIGS. 4A-4J as separate elements from the light guide 102. In other examples (not shown), the banding reduction elements 202, 204, 206, 208, 210, 212, 214, 216, 218, 220 are each an integral part of the end edge 114 of the light guide 102, as described above. In the examples shown in FIGS. 4A-4J, the respective banding reduction element is configured to refract light incident at different locations thereon at respective angles of incidence through different angles of refraction. This scrambles the organized banding of light that occurs without the banding reduction element to produce a more uniform illumination profile on a target surface.

Figure 4A:
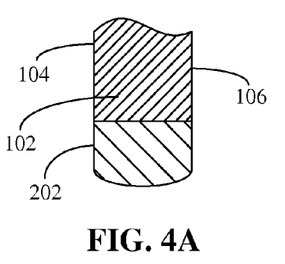
FIGS. 4A-4J are schematic views showing exemplary banding reduction elements.

FIG. 4A shows an example of a banding reduction element 202 that includes a convex surface curved about an axis oriented non-orthogonally (typically parallel) to the intersection of the end edge 114 and one of the major surfaces 104, 106. The convex surface is the curved surface of a portion of a cylinder demarcated by two parallel planes. The cylinder has a circular, elliptical, parabolic, or hyperbolic cross-section, a cross-sectional shape defined by a suitable n-th order polynomial, or another suitable cross-sectional shape.

Figure 4B:
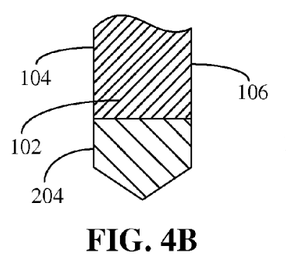

In the example shown in FIG. 4B, a banding reduction element 204 is configured as a symmetrical prismatic element having two plane surfaces oriented at respective angles relative to the major surfaces 104, 106 that intersect to form a ridge oriented non-orthogonally (typically parallel) to the intersection of the end edge 114 and one of the major surfaces 104, 106.

Figure 4C:
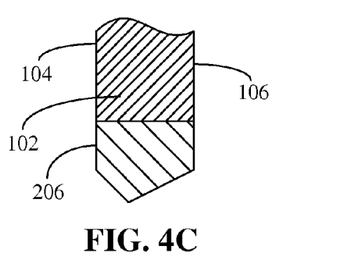

In the example shown in FIG. 4C, a banding reduction element 206 is configured as an asymmetrical prismatic element having two plane surfaces oriented at respective angles relative to the major surfaces 104, 106 that intersect to form a ridge oriented non-orthogonally (typically parallel) to the intersection of the end edge 114 and one of the major surfaces 104, 106 and located asymmetrically with respect to the major surfaces 104, 106.

Figure 4D:
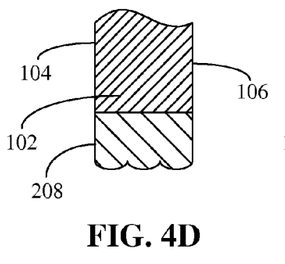

In the example shown in FIG. 4D, a banding reduction element 208 includes convex lenticular grooves oriented non-orthogonally (typically parallel) to the intersection of the end edge 114 and one of the major surfaces 104, 106. Each of the lenticular grooves has a convex surface similar to the convex surface of the banding reduction element 202 shown in FIG. 4A.

Figure 4E:
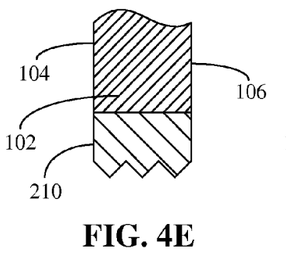

In the example shown in FIG. 4E, a banding reduction element 210 includes prismatic grooves each having two plane surfaces that come together to form a respective ridge oriented non-orthogonally (typically parallel) to the intersection of the end edge 114 and one of the major surfaces 104, 106. Each of the prismatic grooves is formed to have two plane surfaces that intersect to form a ridge similar to the banding reduction element 204 shown in FIG. 4B.

Figure 4F:
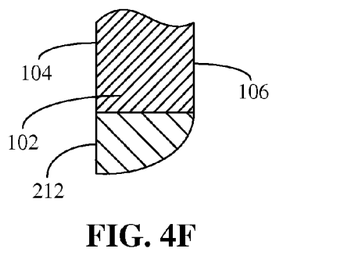

In the example shown in FIG. 4F, a banding reduction element 212 includes a convex surface curved about an axis oriented non-orthogonally (typically parallel) to the intersection of the end edge 114 and one of the major surfaces 104, 106. The convex surface is the curved surface of a portion of a cylinder demarcated by two orthogonal planes. The cylinder has a circular, elliptical, parabolic, or hyperbolic cross-section, a cross-sectional shape defined by a suitable n-th order polynomial, or another suitable cross-sectional shape. Such a cross-sectional shape is also referred to as a bullnose.

Figure 4G:
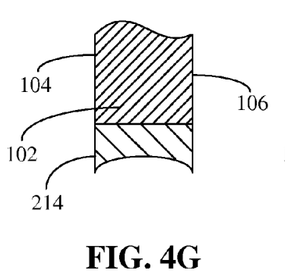

In the example shown in FIG. 4G, a banding reduction element 214 includes a concave surface curved about an axis oriented non-orthogonally (typically parallel) to the intersection of the end edge 114 and one of the major surfaces 104, 106. The concave surface is the curved surface of a portion of a cylinder demarcated by two parallel planes. The cylinder has a circular, elliptical, parabolic, or hyperbolic cross-section, a cross-sectional shape defined by a suitable n-th order polynomial, or another suitable cross-sectional shape.

In some embodiments, the banding reduction element 200 includes a combination of two or more of the banding reduction elements described above. Examples are further set forth in FIGS. 4H and 4I.

Figure 4H:
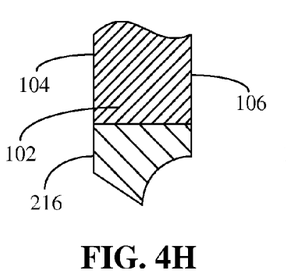

In the example shown in FIG. 4H, a banding reduction element 216 includes a plane surface and a concave surface that intersect to form a ridge oriented non-orthogonally (typically parallel) to the intersection of the end edge 114 and one of major surfaces 104, 106. The plane surface is oriented at an angle relative to the major surface 104. The concave surface is curved about an axis oriented non-orthogonally (typically parallel) to the intersection of the end edge 114 and one of the major surfaces 104, 106. The concave surface is the curved surface of a portion of a cylinder demarcated by two parallel planes. The cylinder has a circular, elliptical, parabolic, or hyperbolic cross-sectional shape, a cross-sectional shape defined by a suitable n-th order polynomial, or another suitable cross-sectional shape.

Figure 4I:
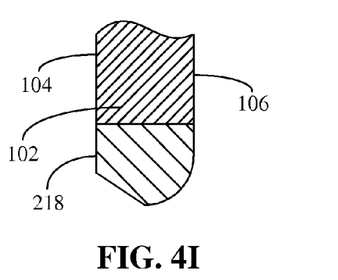

In the example shown in FIG. 4I, a banding reduction element 218 includes a plane surface and a convex surface that intersect to form a ridge oriented non-orthogonally (typically parallel) to the intersection of the end edge 114 and one of major surfaces 104, 106. The plane surface is oriented at an angle relative to the major surface 104. The convex surface is curved about an axis oriented non-orthogonally (typically parallel) to the intersection of the end edge 114 and one of the major surfaces 104, 106. The convex surface is the curved surface of a portion of a cylinder demarcated by two parallel planes. The cylinder has a circular, elliptical, parabolic, or hyperbolic cross-sectional shape, a cross-sectional shape defined by a suitable n-th order polynomial, or another suitable cross-sectional shape.

In other embodiments, the banding reduction element 200 has other suitable light redirecting shapes. For example, other banding reduction elements include convex lenticular grooves or prismatic grooves oriented orthogonally to the major surfaces 104, 106.

In other embodiments, the banding reduction element 200 includes features of well-defined shape, such as prismatic elements, lenticular elements, and other features of well-defined shape that are small relative to the linear dimensions of the end edge 114, and which are referred to herein as banding reduction micro-optical elements (not shown). The smaller of the length and width of a banding reduction micro-optical element is less than one-tenth of the smaller of the length and width of the end edge 114, and the larger of the length and width of the banding reduction micro-optical element is less than one-half of the larger of the length and width of the end edge 114. The length and width of the banding reduction micro-optical element are measured in the plane that is parallel to and includes the end edge 114 of the light guide 102 for flat light guides or along a surface contour for non-flat light guides. The banding reduction element 200 may include banding reduction micro-optical elements instead of or in addition to the shapes described above with reference to FIGS. 4A-4I.

Banding reduction micro-optical elements are shaped to predictably refract light incident thereon. However, one or more of the surfaces of the banding reduction micro-optical elements may be modified, such as roughened, to produce a secondary effect on light incident thereon. Exemplary micro-optical elements suitable for use as banding reduction micro-optical elements are described in U.S. Pat. No. 6,752,505 and, for the sake of brevity, will not be described in detail in this disclosure. The banding reduction micro-optical elements may vary in one or more of size, shape, depth or height, density, orientation, slope angle or index of refraction such that a desired light output from the end edge 114 of the light guide 102 is achieved.

In other embodiments, the banding reduction element 200 additionally includes an optically diffusive surface or other light-scattering elements, which are typically features of indistinct shape or surface texture, such as printed features, ink jet printed features, selectively-deposited features, chemically etched features, laser etched features, and so forth.

Embodiments are contemplated where the banding reduction element 200 modifies the spectrum of the light incident thereon in addition to modifying the light ray angle distribution of this light. In such an embodiment, the banding reduction element additionally includes a spectrum adjuster. In one embodiment, the spectrum adjuster is a wavelength shifting material. Wavelength shifting is used herein to refer to a process in which a material absorbs light of certain wavelengths, and reemits light at one or more different wavelengths. The wavelength-shifting material includes one or more of a phosphor material, a luminescent material, a luminescent nanomaterial such as a quantum dot material, a conjugated polymer material, an organic fluorescent dye, an organic phosphorescent dye, and lanthanide-doped garnet. In another embodiment, the spectrum adjuster is a color attenuator, for example, a dichroic mirror, a hot mirror, a cold mirror, a polychroic mirror, or a color filter.

Figure 4J:
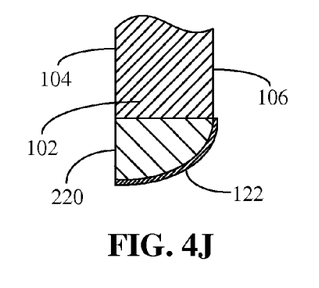

In the example shown in FIG. 4J, the banding reduction element 220 has a bullnose shape similar to the bullnose shape of the banding reduction element 212 shown in FIG. 4F. The banding reduction element 220 further includes a spectrum adjuster 122 located on its curved surface.

In some embodiments, the lighting assembly 100 additionally includes a banding reduction element 200a at at least one of the side edges 108, 110 of the light guide 102. The banding reduction element is configured to reduce the banding effect of light incident thereon. The banding reduction element 200a at at least one of the side edges 108, 110 is configured to redirect light that is incident thereon in a manner that reduces the banding effect, similar to the banding reduction element 200. Reducing the banding effect results in a more uniform intensity of light output from the side edge 108, 110 over a defined range of light ray angles and allows the light output from the side edge 108, 110 to provide useful illumination. The banding reduction element 200a at at least one of the side edges 108, 110 may additionally include a spectrum adjuster, as discussed above in relation to the banding reduction element 200.

With continued reference to FIGS. 2 and 3, light input to the light guide 102 through the light input edge 112 propagates by total internal reflection toward the end edge 114. A predetermined portion of the light is extracted through the first major surface 104 of the light guide 102 by the light extracting elements 105 at least one of the major surfaces 104, 106. Another predetermined portion (typically the remainder) of the light is incident on the banding reduction element 200. The light extracting elements 105 at least one of the major surfaces 104, 106 are configured to extract light with a defined intensity. By defining the intensity of the light extracted through the major surfaces, the intensity of the light incident on the banding reduction element 200 is defined. For example, increasing the number of light extracting elements 105 at least one of the major surfaces 104, 106 increases the intensity of the light extracted through the major surface 104, and therefore reduces the intensity of the light incident on the banding reduction element 200.

The light extracting elements 105 at least one of the major surfaces 104, 106 are also configured to extract light through the first major surface 104 of the light guide 102 with a predetermined light ray angle distribution, and the banding reduction element 200 is configured to redirect light incident thereon with a predetermined light ray angle distribution. In one embodiment, the region 127 of a target surface 124 illuminated by the light extracted through the first major surface 104 does not overlap a region 125 of the target surface 124 illuminated by the light output from the banding reduction element 200. In the examples shown in FIGS. 2 and 3, the lighting assembly 100 is configured to illuminate regions 125 and 127 of a target surface 124. Specifically, the region 125 of the target surface 124 illuminated by the light output from the banding reduction element 200 does not overlap the region 127 illuminated by the light extracted through the first major surface 104. The light extracted through the first major surface 104 and the light output from the banding reduction element 200 therefore does not illuminate a contiguous region of the target surface 124. This allows, as an example, for the extracted and/or output light from the light guide 102 to illuminate one or more distinct regions of interest of the target surface, and not to illuminate a region of non-interest.

Figure 5:
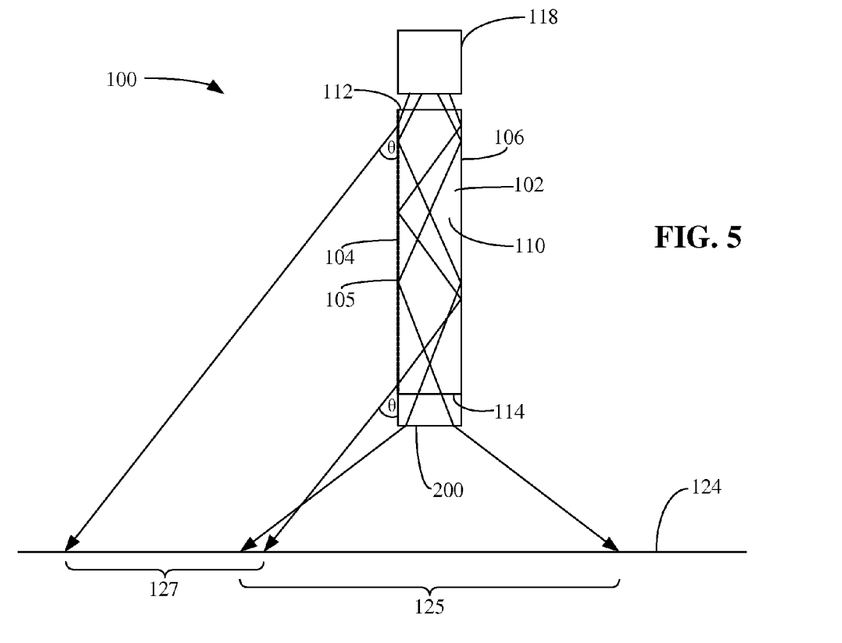
FIGS. 5-12 are schematic views showing parts of other embodiments of a lighting assembly.

In another embodiment, the light extracting elements 105 and/or the banding reduction element 200 are configured to make the region 127 of the target surface 124 illuminated by the light extracted through the first major surface 104 and the region 125 of the target surface 124 illuminated by the light output from the banding reduction element 200 overlap. In the example shown in FIG. 5, the lighting assembly 100 is configured to illuminate regions of a target surface 124 in which the region 125 of the target surface 124 illuminated by the light output from the banding reduction element 200 and the region 127 of the target surface 124 illuminated by the light extracted through the first major surface 104 overlap. The light extracted through the first major surface 104 and the light output from the banding reduction element 200 therefore illuminates a single contiguous region of the target surface 124.

Figure 6:
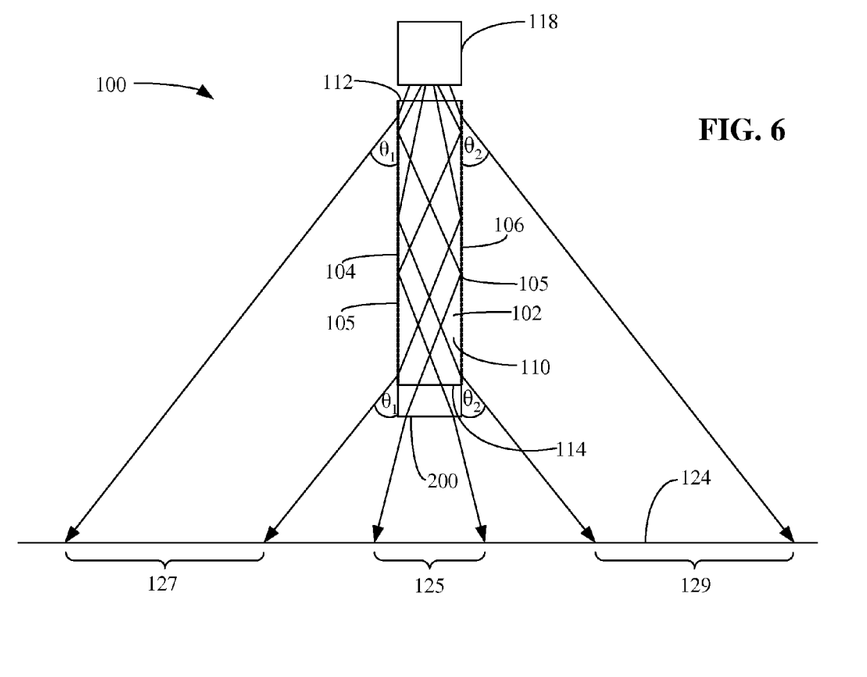
Figure 7:
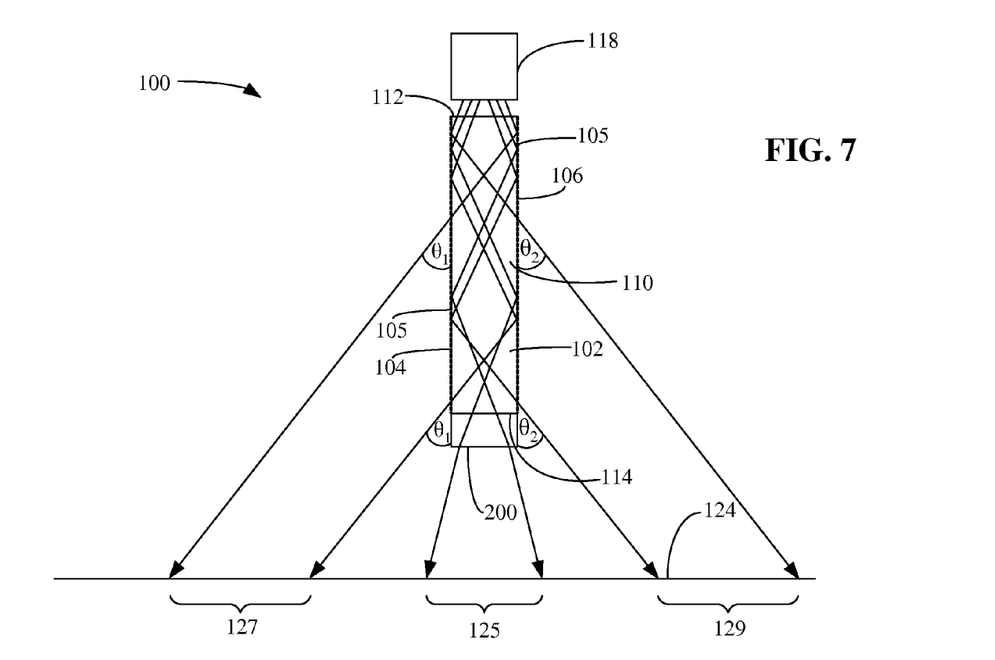
Figure 8:
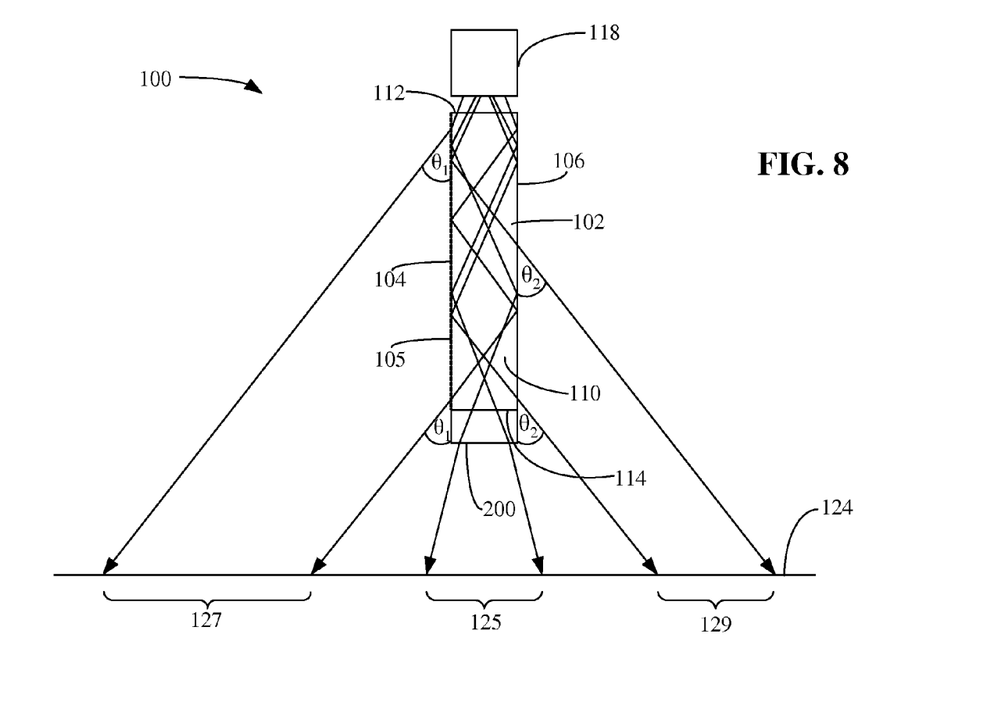

The embodiments described above include light extracting elements 105 configured to extract light through the first major surface 104 of the lighting assembly 100. FIGS. 6-8 show examples of embodiments in which the light extracting elements 105 are configured to extract light through the second major surface 106 in addition to the first major surface 104.

FIGS. 6 and 7 show embodiments in which light extracting elements 105 at one of the major surfaces 104, 106 of the light guide 102 are configured to extract light through the first major surface 104 in a direction away from the light input edge 112 and away from the first major surface 104, and in which light extracting elements 105 at the other of the major surfaces 104, 106 of the light guide 102 are configured to extract light through the second major surface 106 in a direction away from the light input edge 112 and away from the second major surface 106. The light extracting elements 105 at the first major surface 104 may be the same as or different than the light extracting elements 105 at the second major surface 106.

In the embodiment of FIG. 6, light extracting elements 105 at the first major surface 104 transmit light through the light extracting elements 105 and out of the first major surface 104 in a direction away from the light input edge 112 and away from the first major surface 104. Light extracting elements 105 at the second major surface 106 transmit light through the light extracting elements 105 and out of the second major surface 106 in a direction away from the light input edge 112 and away from the second major surface 106.

In the embodiment of FIG. 7, light extracting elements 105 at the second major surface 106 reflect light toward the first major surface 104 so that the light exits the light guide 102 through the first major surface 104. Light extracting elements 105 at the first major surface 104 reflect light toward the second major surface 106 so that the light exits the light guide 102 through the second major surface 106.

FIG. 8 shows an embodiment where light extracting elements 105 at one of the major surfaces 104, 106 of the light guide 102 are configured to extract light through the first major surface 104 in a direction away from the light input edge 112 and away from the first major surface 104, and through the second major surface 106 in a direction away from the light input edge 112 and away from the second major surface 106. In the embodiment of FIG. 8, two types of light extracting elements 105 are at the first major surface 104. The first type of light extracting element transmits light through the light extracting elements 105 and out through the first major surface 104 in a direction away from the light input edge 112 and away from the first major surface 104. The second type of light extracting element reflects light toward the second major surface 106 so that the light exits the light guide 102 through the second major surface 106.

As shown in FIGS. 6-8, the light extracted through the first major surface 104 is directed at an angle $\theta_1$ relative to the first major surface 104, and the light extracted through the second major surface 106 is directed at an angle $\theta_2$ relative to the second major surface 106. In some embodiments, the light extracting elements 105 are configured to extract light through the first major surface 104 and/or the second major surface 106 with a relatively narrow light ray angle distribution. In other embodiments, the light extracting elements 105 are configured to extract light through the first major surface 104 and/or the second major surface 106 with a broader light ray angle distribution. In one embodiment, the light ray angle distribution of the light extracted through the first major surface 104 is the same as the light ray angle distribution of the light extracted through the second major surface 106. In another embodiment, the light ray angle distribution of the light extracted through the first major surface 104 is different than the light ray angle distribution of the light extracted through the second major surface 106. The different light ray angle distributions of the extracted light may provide, for example, different-size illuminated regions of the target surface 124.

Light input to the light guide 102 through the light input edge 112 propagates by total internal reflection toward the end edge 114. A predetermined portion of the light is extracted through the first major surface 104 of the light guide 102 and another predetermined portion of the light is extracted through the second major surface 106 of the light guide 102 by the light extracting elements 105 at least one of the major surfaces 104, 106. Another predetermined portion (typically the remainder) of the light is incident on the banding reduction element 200 at the end edge 114. The light extracting elements 105 at least one of the major surfaces 104, 106 are configured to extract light in a defined intensity profile. By defining the intensity of light extracted through the major surfaces 104, 106, the intensity of the light output from the banding reduction element 200 is defined. For example, increasing the number of light extracting elements 105 at least one of the major surfaces 104, 106 increases the intensity of the light extracted through the major surfaces 104, 106, and therefore reduces the intensity of the light incident on the banding reduction element 200.

The light extracting elements 105 at least one of the major surfaces are configured to extract light through the first major surface 104 of the light guide 102 with a predetermined light ray angle distribution and to extract light through the second major surface 106 of the light guide 102 with a predetermined light ray angle distribution, and the banding reduction element 200 is configured to redirect light incident thereon with a predetermined light ray angle distribution.

In one embodiment, the region 125 of the target surface 124 illuminated by the light output from the banding reduction element 200 does not overlap with the region 127 of the target surface illuminated by the light extracted through the first major surface 104 or the region 129 of the target surface illuminated by the light extracted through the second major surface 106. In the example shown in FIGS. 6-8, the lighting assembly 100 is configured to illuminate regions of the target surface 124, and the region 125 of the target surface 124 illuminated by the light output from the banding reduction element 200 does not overlap the region 127 of the target surface 124 illuminated by the light extracted through the first major surface 104 and the region 129 of the target surface 124 illuminated by the light extracted through the second major surface 106.

Figure 9:
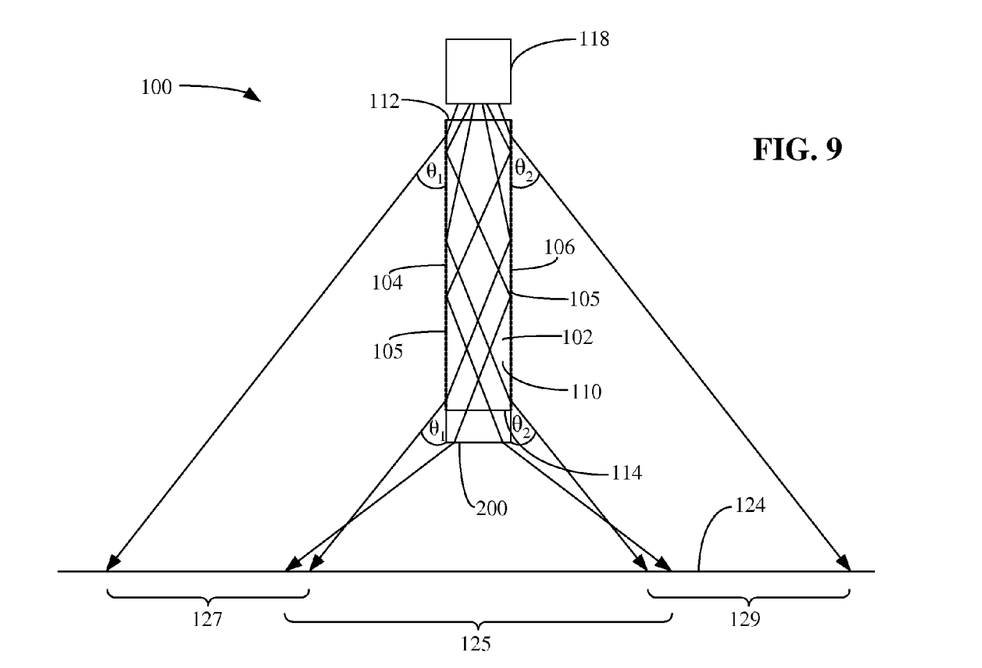

In other embodiments, the region 125 of the target surface 124 illuminated by the light output from the banding reduction element 200 overlaps with one or more of the region 127 of the target surface 124 illuminated by the light extracted through the first major surface 104 and the region 129 of the target surface 124 illuminated by the light extracted through the second major surface 106. In the example shown in FIG. 9, the lighting assembly is configured to illuminate regions of the target surface 124, and the region 125 of the target surface 124 illuminated by the light output from the banding reduction element 200 overlaps the region 127 of the target surface 124 illuminated by the light extracted through the first major surface 104 and the region 129 of the target surface 124 illuminated by the light extracted through the second major surface 106. In the example shown in FIG. 10, the lighting assembly 100 is configured to illuminate regions of the target surface 124, and the region 125 of the target surface 124 illuminated by the light output from the banding reduction element 200 overlaps the region 127 of the target surface 124 illuminated by the light extracted through the first major surface 104 and does not overlap the region 129 of the target surface 124 illuminated by the light extracted through the second major surface 106.

Figure 10:
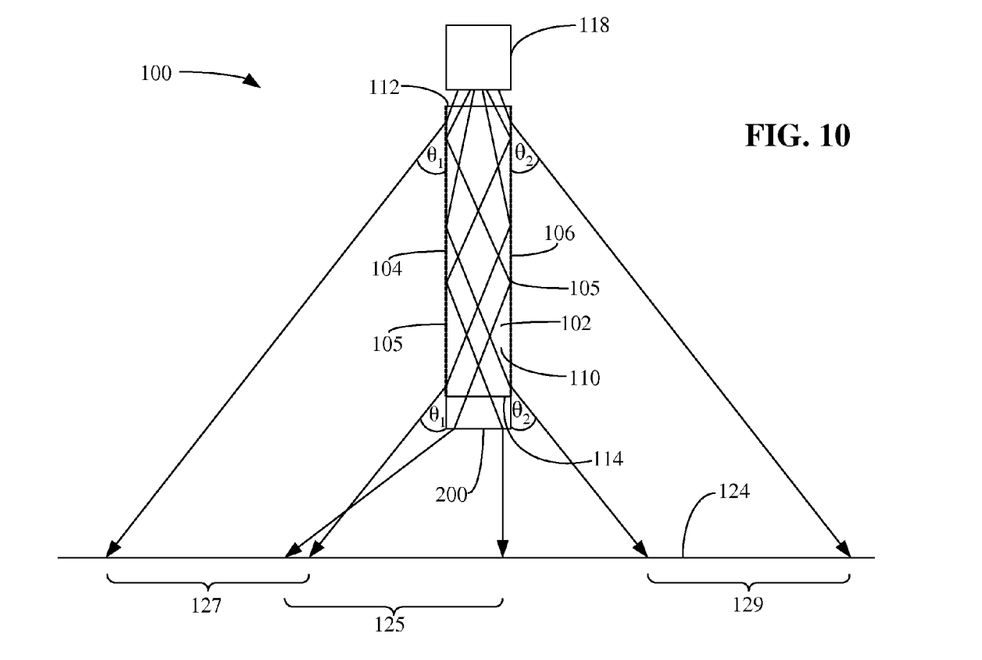

The embodiment of FIG. 10 illustrates an asymmetrical light ray angle distribution of the light output from the banding reduction element 200. Such an asymmetrical output may be provided by using a banding reduction element similar to one of the banding reduction elements shown in FIGS. 4C, 4F, and 4H-4J, or a banding reduction element that alternatively or additionally includes banding reduction micro-optical elements, as described above. In the embodiments of FIGS. 2, 3, and 5-9, which illustrate a symmetrical light ray angle distribution of the light output from the banding reduction element 200, such a symmetrical output may be provided by using a banding reduction element similar to one of the banding reduction elements shown in FIGS. 4A, 4B, 4D, and 4G, or a banding reduction element that alternatively or additionally includes banding reduction micro-optical elements, as described above.

Figure 11:
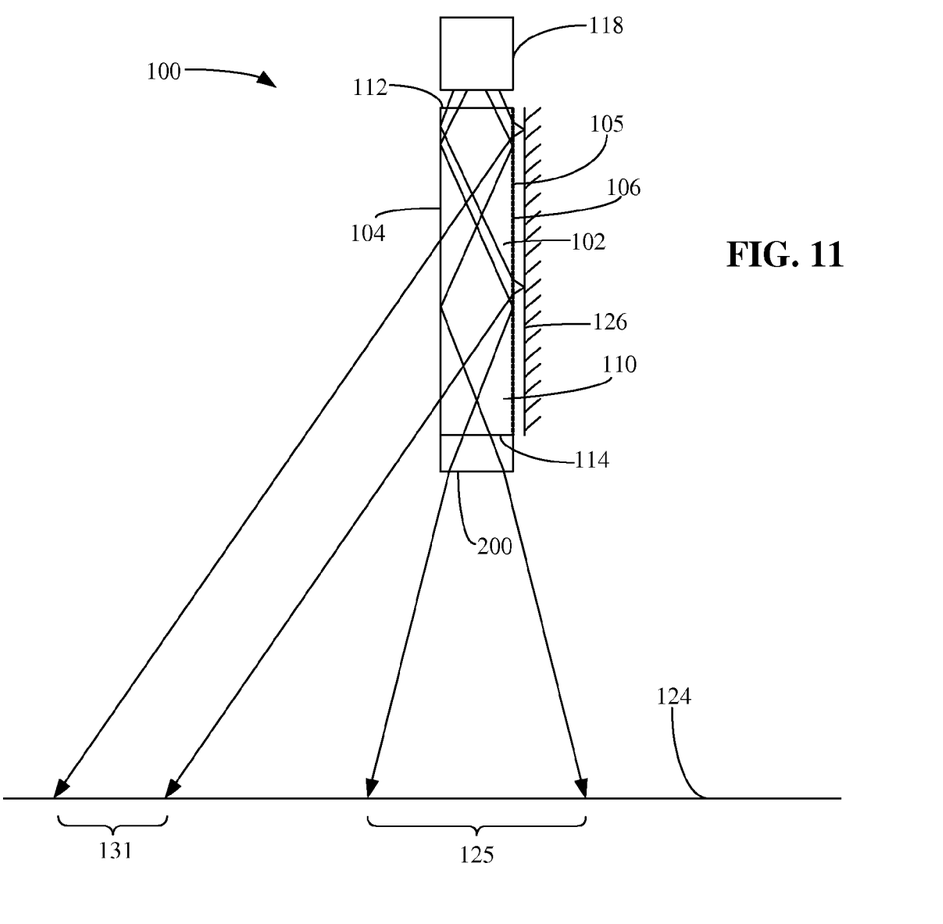

FIG. 11 shows an embodiment in which the lighting assembly 100 includes a reflector 126 adjacent the second major surface 106. The light guide 102 includes light extracting elements 105 configured to extract light through the second major surface 106. The light extracting elements 105 are configured to extract light through the second major surface 106 of the light guide 102 with a predetermined light ray angle distribution. The light extracted through the second major surface 106 is reflected by the reflector 126, re-enters the light guide 102 at the second major surface 106, and is output from the light guide 102 through the first major surface 104 in a direction away from the light input edge 112 and away from the first major surface 104. In an embodiment where the light guide 102 also includes light extracting elements 105 configured to extract light through the first major surface 104, the light extracted through the second major surface 106 and output from the first major surface 104 is combined with the light extracted through the first major surface 104. A region 131 of the target surface 124 is illuminated by the light extracted through the second major surface 106 and output from the first major surface 104. In the illustrated embodiment, the region 125 of the target surface 124 illuminated by the light output from the banding reduction element 200 does not overlap with a region 131 of the target surface 124 illuminated by the light extracted through the second major surface 106 and output from the first major surface 104.

The embodiments described above provide a lighting assembly 100 that is configured to illuminate one or more regions of interest of the target surface 124. In other embodiments, the lighting assembly is configured to illuminate target surfaces that are respective surfaces of various spatially-separated objects of interest. In an example, the lighting assembly is configured to illuminate a first target surface, which is the surface of a first object of interest, by the light output from the banding reduction element, and to illuminate a second target surface, which is the surface of a second object of interest, by the light output through the first major surface. Such an example is described below with reference to the embodiment of FIG. 12.

Figure 12:
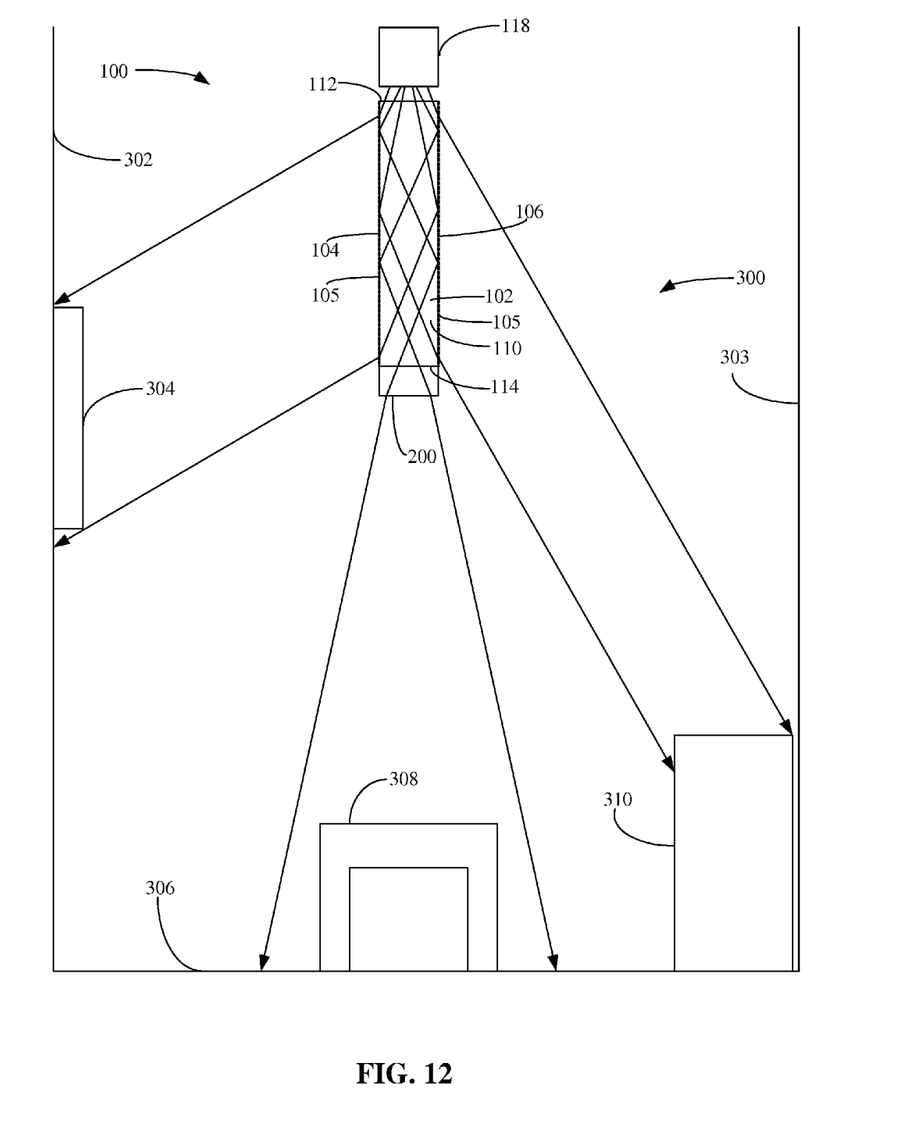

The lighting assembly 100 is configurable for use in various applications. FIG. 12 illustrates an exemplary application of the lighting assembly 100, as described with reference to FIGS. 6-8, in a room 300. The room 300 includes walls 302, 303 and floor 306. A first object of interest is a picture 304 hanging on the wall 302. A second object of interest is a table 308 standing on the floor 306, and a third object of interest is a desk 310 also standing on the floor 306. The lighting assembly 100 is configured to illuminate the surface of the picture 304 on the wall 302, and is configured to illuminate the surface of the table 308 and the surface of the desk 310 on the floor 306. The light extracting elements 105 of the light guide 102 are configured such that the light extracted through the first major surface 104 of the light guide 102 illuminates the surface of the picture 304 on the wall 302 as a first target surface; and the light extracted through the second major surface 106 of the light guide 102 illuminates the surface of the desk 310 as a second target surface. The banding reduction element 200 is configured such that the light output from the banding reduction element 200 of the light guide 102 illuminates the surface of the table 308 as a third target surface, and such that the banding effect of light output from the banding reduction element 200 and illuminating the surface of the table 308 is reduced. The light guide 102 has a dimension in a direction orthogonal to the plane of FIG. 12 sufficient to provide adequate illumination in that dimension.

Returning to FIG. 1, additional optional details regarding the lighting assembly 100 will be described. The lighting assembly 100 may be configured as a hanging light (as shown), a ceiling light (e.g., a lighting assembly that is located below a ceiling, nominally parallel thereto), a wall sconce, a table lamp, a task light, or another suitable illumination device. The lighting assembly 100 may additionally include a housing 128 for retaining the light source assembly 116 and the light guide 102. The housing 128 may retain a heat sink or may itself function as a heat sink. In some embodiments, the lighting assembly 100 includes a mounting mechanism 130 (e.g., a chain or wire in the case of a hanging light, clips or fasteners in the case of a ceiling light or wall sconce, etc.) to mount the lighting assembly to a retaining structure (e.g., a ceiling, a wall, etc.). In other embodiments, the mounting mechanism 130 is a stand and/or base assembly to allow the lighting assembly 100 to function as a floor lamp, table lamp, task lamp, etc. Electrical power is supplied to the lighting assembly 100 through appropriate conductors, which in some cases may form part of or pass through the mounting mechanism 130. Parts of the lighting assembly 100, such as the light guide 102 and the light source 118, are described above with reference to FIGS. 2-12.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

What is claimed is:

1. A lighting assembly, comprising:
   a light guide having a first major surface, a second major surface opposite the first major surface, a light input edge, and an end edge distal the light input edge, wherein light input to the light guide through the light input edge propagates by total internal reflection toward the end edge;
   light extracting elements at at least one of the major surfaces of the light guide, the light extracting elements configured to extract light through the first major surface in a direction away from the light input edge and away from the first major surface; and
   a banding reduction element at the end edge configured to redirect light incident thereon to spread light output from the lighting assembly through the end edge in a direction away from the light input edge and to reduce a banding effect of the light output from the lighting assembly through the end edge
   wherein
   the light guide additionally comprises opposed side edges, each side edge extending between the major surfaces of the light guide and extending between the light input edge and the end edge, and
   the lighting assembly additionally comprises an additional banding reduction element at at least one of the side edges of the light guide.

2. The lighting assembly of claim 1, wherein the lighting assembly is configured to illuminate a target surface, and a region of the target surface illuminated by the light output from the banding reduction element overlaps a region of the target surface illuminated by the light extracted through the first major surface.

3. The lighting assembly of claim 1, wherein the lighting assembly is configured to illuminate a target surface, and a region of the target surface illuminated by the light output from the banding reduction element does not overlap a region of the target surface illuminated by the light extracted through the first major surface.

4. The light assembly of claim 1 wherein the light extracting elements are additionally configured to extract light through the second major surface in a direction away from the light input edge and away from the second major surface.

5. The lighting assembly of claim 4, wherein the light extracted through the first major surface has a first light ray angle distribution and the light extracted through the second major surface has a second light ray angle distribution, different from the first light ray angle distribution.

6. The lighting assembly of claim 4, wherein the lighting assembly is configured to illuminate a target surface, and a region of the target surface illuminated by the light output from the banding reduction element overlaps a region of the target surface illuminated by the light extracted through one of the first major surface and the second major surface.

7. The lighting assembly of claim 4, wherein the lighting assembly is configured to illuminate a target surface, and a region of the target surface illuminated by the light output from the banding reduction element does not overlap a region of the target surface illuminated by the light extracted through the first major surface and a region of the target surface illuminated by the light extracted through the second major surface.

8. The lighting assembly of claim 4, wherein the lighting assembly is configured to illuminate a target surface, and a region of the target surface illuminated by the light output from the banding reduction element overlaps a region of the target surface illuminated by the light extracted through the first major surface and a region of the target surface illuminated by the light extracted through the second major surface.

9. The lighting assembly of claim 1, wherein the banding reduction element comprises at least one of a prismatic element, lenticular element, and micro-optical elements.

10. The lighting assembly of claim 1, wherein the light guide has a thickness at the end edge, and the banding reduction element has a dimension of the same order of magnitude as, or less than, the thickness.

11. The lighting assembly of claim 1, wherein the light guide has a thickness in a thickness direction orthogonal to the major surfaces, and the banding reduction element is configured to spread the light incident thereon in the thickness direction.

12. The lighting assembly of claim 1, wherein the banding reduction element additionally comprises a color attenuator.

13. The lighting assembly of claim 12, wherein the color attenuator comprises at least one of a dichroic mirror, hot mirror, cold mirror, polychroic mirror, and color filter.

14. The lighting assembly of claim 1, wherein the light extracting elements are at both of the major surfaces.

15. The lighting assembly of claim 14, wherein the light extracting elements at the first major surface are different from the light extracting elements at the second major surface.

16. The lighting assembly of claim 1, wherein at least a portion of the light guide is curved.

17. The lighting assembly of claim 1, wherein the light guide is planar.

18. The lighting assembly of claim 1, further comprising a reflector adjacent one of the major surfaces.

19. The lighting assembly of claim 1, further comprising a light redirecting member or a diffusing member adjacent one of the major surfaces.

20. The lighting assembly of claim 1, additionally comprising a solid state light source located adjacent the light input edge.

21. The lighting assembly of claim 20, wherein the solid state light source comprises a light emitting diode.

22. The lighting assembly of claim 1, wherein the banding reduction element is interchangeable with another banding reduction element.

23. The lighting assembly of claim 1, wherein the banding reduction element is integral with the light guide.

24. The lighting assembly of claim 1, wherein the additional banding reduction element comprises at least one of a prismatic element, lenticular element, and micro-optical elements.

25. The lighting assembly of claim 1, wherein the lighting assembly is configured to illuminate a region of a target surface by the light output from the banding reduction element, and to illuminate a region of an additional target surface by the light extracted through the first major surface.

26. The lighting assembly of claim 1, wherein the banding reduction element is a separate component from the light guide.

27. The lighting assembly of claim 26, wherein the end edge of the light guide is specularly transmissive.

* * * * *